(12) United States Patent
Ganda et al.

(10) Patent No.: US 9,691,005 B2
(45) Date of Patent: Jun. 27, 2017

(54) CAPTURING UNIQUE SCREENSHOTS

(71) Applicant: CA, Inc., New York, NY (US)

(72) Inventors: Madhusudhan Ganda, Kadapa (IN); Mohammad G. Bhasha, Bangalore (IN); Saorabh Singh, Bangalore (IN); Abhijit Pati, Bangaluru (IN); Vikrant Nandakumar, Bangalore (IN)

(73) Assignee: CA, Inc., Islandia, NY (US)

( * ) Notice: Subject to any disclaimer, the term of this patent is extended or adjusted under 35 U.S.C. 154(b) by 24 days.

(21) Appl. No.: 14/816,197

(22) Filed: Aug. 3, 2015

(65) Prior Publication Data
US 2017/0039448 A1 Feb. 9, 2017

(51) Int. Cl.
*G06K 9/00* (2006.01)
*G06K 9/62* (2006.01)
*G06K 9/20* (2006.01)
*H04N 1/44* (2006.01)

(52) U.S. Cl.
CPC .......... *G06K 9/6202* (2013.01); *G06K 9/20* (2013.01); *H04N 1/4493* (2013.01)

(58) Field of Classification Search
None
See application file for complete search history.

(56) References Cited

U.S. PATENT DOCUMENTS

| 5,668,897 | A | * | 9/1997 | Stolfo | G06F 17/30247 382/283 |
| 8,341,538 | B1 | * | 12/2012 | Antczak | G06F 8/77 715/764 |
| 8,671,389 | B1 | | 3/2014 | Buryak et al. | |
| 9,298,598 | B2 | * | 3/2016 | Fryc | G06F 11/3688 |
| 2006/0085132 | A1 | * | 4/2006 | Sharma | G06F 11/3688 702/1 |
| 2011/0231823 | A1 | * | 9/2011 | Fryc | G06F 11/3688 717/125 |

* cited by examiner

*Primary Examiner* — Tahmina Ansari
(74) *Attorney, Agent, or Firm* — Stevens & Showalter, LLP

(57) ABSTRACT

A machine-executable process comprises receiving a request to take a screenshot of a display and receiving page source information of the display. The page source information is compared to stored page source information of displays that have had a screenshot taken to determine whether a screenshot of the display has already been taken. If a screenshot has not already been taken of the display, then a screenshot is taken and the page source information of the display is added to the stored page source information.

20 Claims, 4 Drawing Sheets

CAPTURING UNIQUE SCREENSHOTS

BACKGROUND

Various aspects of the present disclosure relate generally to capturing unique screenshots during software testing and specifically to capturing unique screenshots within a graphical user interface testing environment on a mainframe system. Thus, the present disclosure recites an improvement in the technological field of software testing and verification.

Localization (i.e., L10n) is the adaption of a product to different dialects. For example, when a product is first released, any English versions may be in American English. However, over time, the product may be released in Canada, the United Kingdom, or India, and the product is then localized to that country's dialect of English.

In the world of software products, many software products include a graphical user interface (GUI) with words written in a specific language. However, those software products may be released in other regions where the written language changes. As such, the software product GUIs must be localized and tested to verify that they function properly and display the correct dialect on all screens of the GUI. Therefore, when testing, a screenshot is taken of each screen of the GUI presented, and a user can verify that the localization was performed correctly.

BRIEF SUMMARY

According to aspects of the present invention, a process for capturing unique screenshots comprises receiving a request to take a screenshot of a display and receiving page source information of the display. The page source information is compared to stored page source information of displays that have had a screenshot already taken to determine whether a screenshot of the display has already been taken. If a screenshot has not already been taken of the display, then a screenshot is taken and the page source information of the display is added to the stored page source information.

DETAILED DESCRIPTION

According to various aspects of the present disclosure, page source information about a display is checked before taking a screenshot of the display. If the page source information of the display indicates that a screenshot of the display has not been taken, then a screenshot is taken of the display and stored for later analysis. However, if the page source information of the display indicates that a screenshot has already been taken, then no screenshot is taken of the redundant display. Thus, no duplicate screenshots are taken, which saves memory space and reduces an amount of time taken to manage screenshots to remove any duplicate screenshots.

Further, user information may be masked from the source data. Thus, if the only thing that changes between stored displays and the current display is user information, then a screenshot of the current display is not taken.

Figure 1:
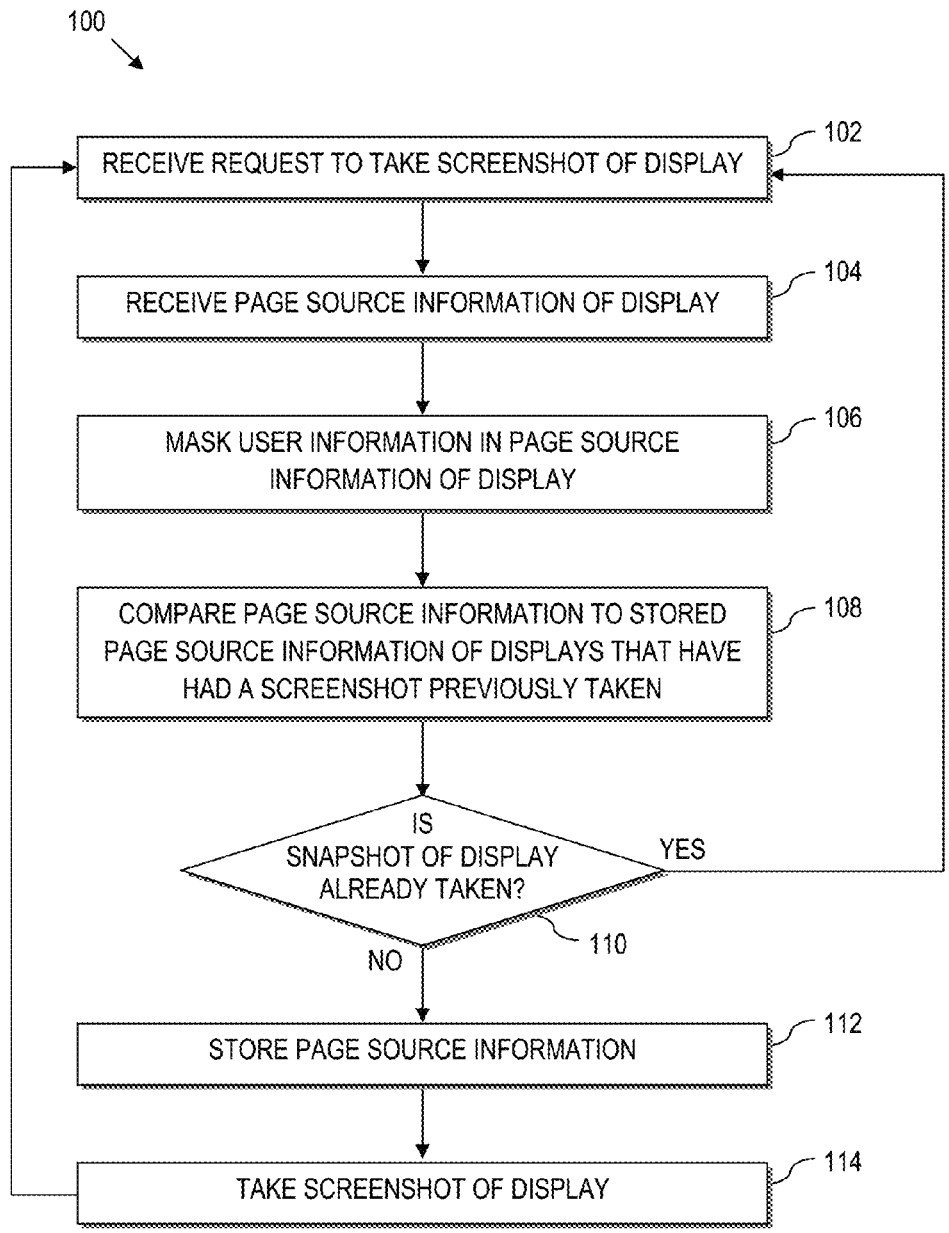
FIG. 1 is a flow chart that illustrates a method for capturing unique screenshots during graphical user interface testing, according to various aspects of the present disclosure.

Referring now to FIG. 1, a method 100 for capturing unique screenshots is presented. In this regard, the method 100 may be implemented on computer-readable hardware that stores machine-executable program code, where the program code instructs a processor to implement the described method. The method 100 may also be executed by a processor coupled to memory, where the processor is programmed by program code stored in the memory, to perform the described method.

At 102, a request to take a screenshot of a display is received. The request may take any form such as an explicit request in the testing environment, a change from one display to another, etc. For example, when running a graphical user interface (GUI) through automated localization testing, various displays are generated for display. These displays should be captured (i.e., saved as a screenshot) for a user to analyze. Thus, during localization testing of a GUI, various requests to take a screenshot are received. However, the method 100 is not limited to localization testing, as the methods and systems described herein can be used in any environment where screenshots are taken automatically.

At 104, page source information for the display is received. For example, the page source information may be received with the request to take the screenshot or shortly thereafter. As another example, when the request is received, an explicit request for page source information may be sent, and the page source information is received in response to the explicit request for page source information.

Optionally at 106, any user information from the source page information is masked. For example, if the display includes a welcome message to the user that includes the user's name, then the user's name would be masked out. Therefore, during a later comparison, the user's name will not affect the comparison results.

Sample source code is shown below for masking the user information in the source page information:

```
</nav><div id="content_wrapper" style="height: 100%;
position: relative; ...
    <a class="nav-toggle" href="http://patab02-i132990:8080/
    admin/#"></a>
    <h1 class="ca-logo logo ng-binding">CA Technologies</h1>
    <ul id="courtesy_nav">
        <li class="ui-popover-link ng-scope">
            <cite class="medium-avatar popover-open user-cite" data-
            target="#user-actions">
                <span class="user-name ng-binding">xxxx xxx.
                </span>
            </cite>
        <div class="popover compact-popover populate-popover ui-popover"
        id="user-actions">
<div class="popover-shroud"></div>
...
```

At 108, the page source information for the current display is compared to saved source page information from displays that previously had a screenshot taken. For example, when a screenshot of a display is taken, the source page information of the display is stored in a table. Then, when a new request for a screenshot for a new display is received, page source information for the new display is directly compared to page source information stored in the table.

Alternatively, the page source information may be hashed. Thus instead of a direct comparison between the page source information and the stored page source information from the outset, the page source information may be run though a hash function to create a hash of the page source information. Then, when storing the page source information in a hash map, the page source information is stored as a value at an index defined by the hash of the page source information. When making a comparison, a hash is taken of the new page source information, and that hash indicates where to look in the hash table. If the space in the hash table defined by the hash is empty, then the comparison reveals that the current display is new. However, if the space in the hash table defined by the hash includes one or more values, then the page source information is compared to each entry of page source information at that space in the hash table. If the comparison reveals no matches, then the current display is new. However, if there is a match, then the comparison reveals that a screenshot of the current display has already been taken.

If any of the page source information has been masked, then the comparisons and hashing described above may be performed on all of the page source data (i.e., the information before it was masked), all of the page source data using the masked information as values (instead of the information before it was masked), or only the unmasked portions. Thus, if a screenshot with old user information is compared to a display with new user information, there will not be a false positive because the user information is essentially ignored.

At 110, a decision is made based on the result of the comparison of 108. If there is a match between the page source information of the current display and the stored page source information, then a screenshot of the current display has already been taken. Thus, the method 100 ends or loops back to 102 until a new request has been received.

However, if there is no match, then a screenshot of the current display has not been taken, and the method 100 continues onto 112 and stores the page source information of the current display. The page source information can be stored in any way. For example, the page source information may be stored in a file, a hash table (as described above), a different type of table, etc. The updated file/table can then be stored as an object for future reference.

At 114, a screenshot of the current display is taken and stored for later analysis. The method 100 ends or loops back to 102 until a new request has been received. As should be appreciated, the order of the boxes of the flow chart does not indicate a necessary order in performing the method 100. For example, the screenshot of the display may be taken before the page source information is stored or concurrently with the page source information being stored.

Figure 2:
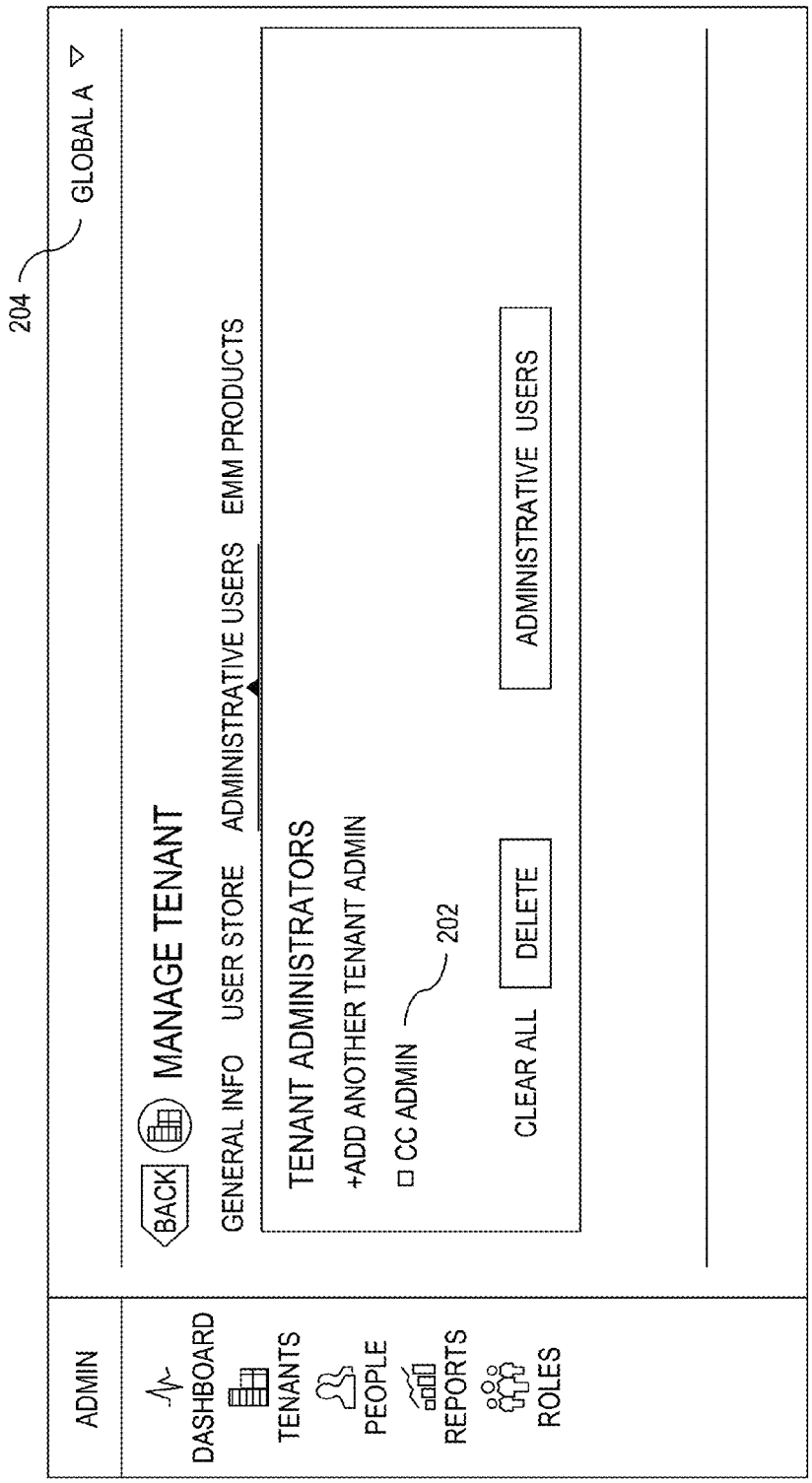
FIG. 2 is an example of a screenshot where sensitive information has not been masked, according to various aspects of the present disclosure.

A few examples are presented to help illustrate the method 100 of FIG. 1. In a first example, a system is running the method of FIG. 1 with the following rules: none of the data will be masked and a hash table is not used. A test engineer starts an automation (i.e., automatic test) on a program to determine if localization efforts with the program are functioning properly. Eventually, a GUI display is created (which looks like FIG. 2), and a screenshot request is sent to the system along with page source information for the display. The system receives both the request and the page source information and compares the page source information with previously stored page source information (e.g., stored from previous automations, previous screenshots of the current automation, or both). In this case, it is determined that none of the stored page source information matches the current page source information. Therefore, a screenshot is taken of the current display, and the current page source information is stored with the previously stored page source information.

In a second example, a system is running the method of FIG. 1 with the following rules: none of the data will be masked and a hash table is not used. A test engineer starts an automation on a program to determine if localization efforts with the program are functioning properly. Eventually, a GUI display is created (which looks like FIG. 2), and a screenshot request is sent to the system along with page source information for the display. The system receives both the request and the page source information and compares the page source information with previously stored page source information. In this case, the page source information matches one of the stored page source information, which indicates that a screenshot of this display has already been taken. Therefore, another screenshot is not taken, and the process ends, waiting for another request.

In a third example, a system is running the method of FIG. 1 with the following rules: none of the data will be masked, but a hash table is used. A test engineer starts an automation on a program to determine if localization efforts with the program are functioning properly. Eventually, a GUI display is created (which looks like FIG. 2), and a screenshot request is sent to the system along with page source information for the display. The system receives both the request and the page source information and compares the page source information with previously stored page source information. The system performs a hashing function on the page source information to generate an index for a hash table. The system looks at the hash table at the index and finds that page source information is present at that index, so the system compares the page source information with the page source information stored at the index of the hash table. The page source information does not match, so a screenshot is taken of the current display, and the current page source information is stored in the hash table at the index (thus, there are two pieces of page source information at that index).

In a fourth example, a system is running the method of FIG. 1 with the following rules: user information will be masked and a hash table is used. A test engineer starts an automation on a program to determine if localization efforts with the program are functioning properly. Eventually, a GUI display is created (which looks like FIG. 2), and a screenshot request is sent to the system along with page source information for the display. The system receives both the request and the page source information and compares the page source information with previously stored page source information. The system masks out user information (which in this case is "CC ADMIN" 202 and "GLOBAL A" 204) and hashes the unmasked page source information to generate an index for a hash table. The system looks at the hash table at the index and finds that page source information is present at that index, so the system compares the page source information with the page source information stored at the index of the hash table. The page source information matches, which indicates that a screenshot of this display has already been taken. Therefore, another screenshot is not taken, and the process ends, waiting for another request.

Figure 3:
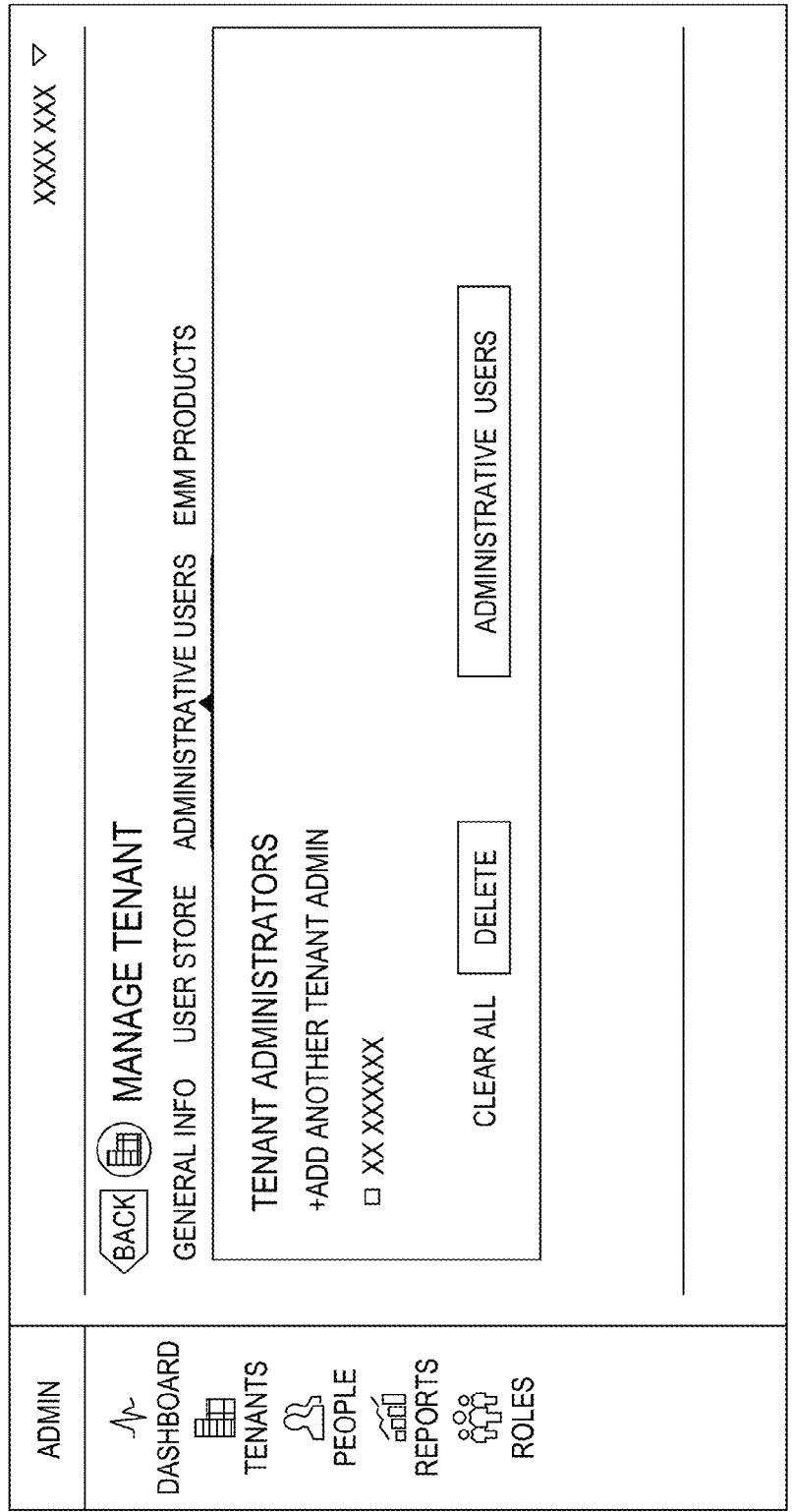
FIG. 3 is an example of a screenshot where sensitive information has been masked, according to various aspects of the present disclosure.

In a fifth example, a system is running the method of FIG. 1 with the following rules: user information will be masked and a hash table is used. A test engineer starts an automation on a program to determine if localization efforts with the program are functioning properly. Eventually, a GUI display is created (which looks like FIG. 2), and a screenshot request is sent to the system along with page source information for the display. The system receives both the request and the page source information and compares the page source information with previously stored page source information. The system masks out user information (which in this case is "CC ADMIN" 202 and "GLOBAL A" 204) and hashes the unmasked page source information to generate an index for a hash table. The system looks at the hash table at the index and finds that page source information is not present at the index, so the system takes a screenshot of the masked version of the display (shown in FIG. 3).

In a sixth example, a system is running the method of FIG. 1 with the following rules: user information will be masked and a hash table is used. A test engineer starts an automation on a program to determine if localization efforts with the program are functioning properly. Eventually, a GUI display is created (which looks like FIG. 2), and a screenshot request is sent to the system along with page source information for the display. The system receives both the request and the page source information and compares the page source information with previously stored page source information. The system masks out user information (which in this case is "CC ADMIN" 202 and "GLOBAL A" 204) and hashes the unmasked page source information to generate an index for a hash table. The system looks at the hash table at the index and finds that page source information is not present, so the system takes a screenshot of the unmasked version of the display (shown in FIG. 2).

Figure 4:
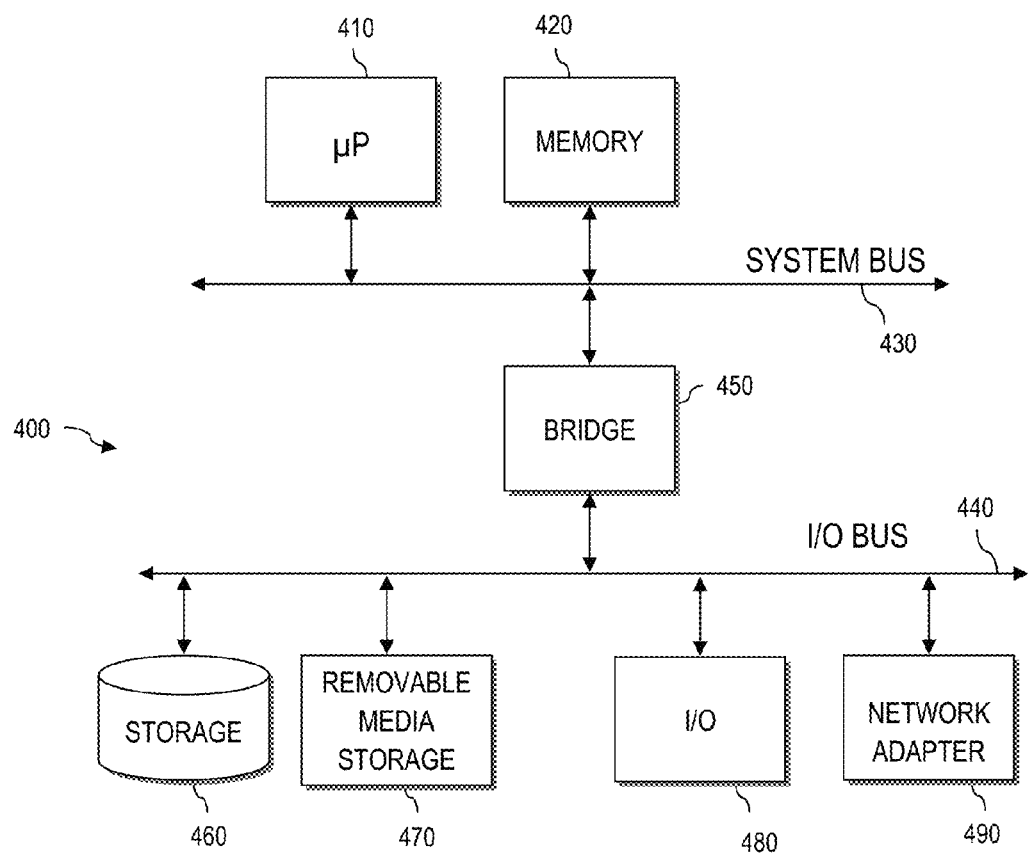
FIG. 4 is a block diagram of a computer system having a computer readable storage medium for implementing functions according to various aspects of the present disclosure as described in greater detail herein.

Referring to FIG. 4, a block diagram of a data processing system is depicted in accordance with the present invention. Data processing system 400 may comprise a symmetric multiprocessor (SMP) system or other configuration including a plurality of processors 410 connected to system bus 420. Alternatively, a single processor 410 may be employed. Also connected to system bus 420 is memory controller/cache 430, which provides an interface to local memory 440. An I/O bus bridge 450 is connected to the system bus 420 and provides an interface to an I/O bus 460. The I/O bus may be utilized to support one or more buses and corresponding devices 470, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 480, storage 590 and a computer usable storage medium 495 having computer usable program code embodied thereon. The computer usable program code may be executed to implement any aspect of the present invention, for example, to implement any aspect of any of the methods and/or system components illustrated in FIGS. 1-3.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using an Network Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A machine-executable process comprising:
   receiving a request to take a screenshot of a display;
   receiving page source information of the display;
   comparing the page source information to stored page source information of displays that have had a screenshot taken to determine whether a screenshot of the display has already been taken; and
   performing, only if a screenshot of the display has not already been taken:
      adding the page source information of the display to the stored page source information; and
      taking a screenshot of the display.

2. The machine-executable process of claim 1 further comprising masking user information in the page source information of the display.

3. The machine-executable process of claim 2, wherein taking a screenshot of the display further comprises taking a screenshot of the display in a masked form.

4. The machine-executable process of claim 2, wherein taking a screenshot of the display further comprises taking a screenshot of the display in an unmasked form.

5. The machine-executable process of claim 2, wherein taking a screenshot of the display further comprises: taking two screenshots of the display, wherein the two screenshots include a first screenshot of the display in an unmasked form and a second screenshot of the display in a masked form.

6. The machine-executable process of claim 2 further comprising:
   hashing the page source information of the display that is not masked;
   wherein comparing the page source information to stored page source information further comprises comparing the hashed page source information to hash information stored in a hash table to determine whether a screenshot of the display has already been taken.

7. The machine-executable process of claim 1 further comprising hashing the page source information of the display.

8. The machine-executable process of claim 7, wherein comparing the page source information to stored page source information further comprises comparing the hashed page source information to hash information stored in a hash table to determine whether a screenshot of the display has already been taken.

9. The machine-executable process of claim 7, wherein hashing the page source information of the display further comprises creating a hash tuple of a key and a value, where the key is a hash of the page source information and the value is the page source information.

10. The machine-executable process of claim 7, wherein adding the page source information of the display to the stored page source information further comprises adding the hashed page source information to the hash table.

11. A system comprising a hardware processor coupled to memory, wherein the processor is programmed to take a screenshot of a display by:
    receiving a request to take a screenshot of a display;
    receiving page source information of the display;
    comparing the page source information to stored page source information of displays that have had a screenshot taken to determine whether a screenshot of the display has already been taken; and
    performing, only if a screenshot of the display has not already been taken:

adding the page source information of the display to the stored page source information; and taking a screenshot of the display.

12. The system of claim 11, wherein the processor is further programmed to perform masking user information in the page source information of the display.

13. The system of claim 12, wherein taking a screenshot of the display further comprises taking a screenshot of the display in a masked form.

14. The system of claim 12, wherein taking a screenshot of the display further comprises taking a screenshot of the display in an unmasked form.

15. The system of claim 12, wherein taking a screenshot of the display further comprises: taking two screenshots of the display, wherein the two screenshots include a first screenshot of the display in an unmasked form and a second screenshot of the display in a masked form.

16. The system of claim 12, wherein the processor is further programmed to perform:

hashing the page source information of the display that is not masked;

wherein comparing the page source information to stored page source information further comprises comparing the hashed page source information to hash information stored in a hash table to determine whether a screenshot of the display has already been taken.

17. The system of claim 11, wherein the processor is further programmed to perform hashing the page source information of the display.

18. The system of claim 17, wherein comparing the page source information to stored page source information further comprises comparing the hashed page source information to hash information stored in a hash table to determine whether a screenshot of the display has already been taken.

19. The system of claim 17, wherein adding the page source information of the display to the stored page source information further comprises adding the hashed page source information to the hash table.

20. Computer-readable hardware with program code stored thereon, wherein the program code instructs a hardware processor to perform:

receiving a request to take a screenshot of a display;

receiving the page source information of the display;

comparing the page source information to stored page source information of displays to determine whether a screenshot of the display has already been taken; and performing, only if a screenshot of the display has not already been taken:

adding the page source information of the display to the stored page source information; and taking a screenshot of the display.

* * * * *